(12) United States Patent
Gakhar et al.

(10) Patent No.: US 8,773,095 B2
(45) Date of Patent: Jul. 8, 2014

(54) STARTUP CIRCUIT FOR AN LDO

(75) Inventors: Vikram Gakhar, Bangalore (IN);
Preetam Charan Anand Tadeparthy, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 230 days.

(21) Appl. No.: 12/649,035

(22) Filed: Dec. 29, 2009

(65) Prior Publication Data
US 2011/0156672 A1   Jun. 30, 2011

(51) Int. Cl.
*G05F 1/00* (2006.01)

(52) U.S. Cl.
USPC .......................................... 323/273; 323/901

(58) Field of Classification Search
USPC ................... 323/268, 271–281, 901
See application file for complete search history.

(56) References Cited

U.S. PATENT DOCUMENTS

| | | | | |
|---|---|---|---|---|
| 5,381,082 A * | 1/1995 | Schlicht | | 323/280 |
| 6,661,211 B1 * | 12/2003 | Law et al. | | 323/268 |
| 7,199,565 B1 * | 4/2007 | Demolli | | 323/273 |
| 7,400,121 B2 * | 7/2008 | Martins | | 323/274 |
| 7,446,515 B2 * | 11/2008 | Wang | | 323/280 |
| 7,586,297 B2 * | 9/2009 | Kitagawa | | 323/901 |
| 7,652,898 B2 * | 1/2010 | Kim et al. | | 323/901 |
| 7,679,437 B2 | 3/2010 | Tadeparthy | | |
| 7,714,553 B2 * | 5/2010 | Lou | | 323/276 |
| 7,719,243 B1 * | 5/2010 | Balogh | | 323/281 |
| 7,940,124 B2 * | 5/2011 | Kolakovic et al. | | 330/296 |
| 7,969,135 B2 * | 6/2011 | Luzzi et al. | | 323/299 |
| 8,022,682 B2 * | 9/2011 | Honda et al. | | 323/901 |
| 8,049,551 B2 * | 11/2011 | Kotowski et al. | | 327/536 |
| 8,139,792 B2 * | 3/2012 | Magrath | | 381/120 |
| 8,299,765 B2 * | 10/2012 | Hirano | | 323/266 |

OTHER PUBLICATIONS

U.S. Appl. No. 13/235,529, filed Sep. 19, 2011.

* cited by examiner

*Primary Examiner* — Jue Zhang

(74) *Attorney, Agent, or Firm* — William B. Kempler; Frederick J. Telecky, Jr.

(57) ABSTRACT

A startup circuit in an LDO includes an operational amplifier having an inverting terminal and a non-inverting terminal and an output node. The non-inverting terminal receives a reference voltage. The startup circuit further includes a feedback capacitor coupled between an output node and the inverting terminal and a current source coupled between the inverting terminal and ground such that the current source and the feedback capacitor together control rate of change of an output voltage of the operational amplifier. A comparator is used to stop the rate of change of output voltage after the output voltage reaches a desired value.

14 Claims, 3 Drawing Sheets

STARTUP CIRCUIT FOR AN LDO

TECHNICAL FIELD

Embodiments of the disclosure relate to startup circuit in a low dropout regulator (LDO).

BACKGROUND

When an LDO is activated, an output capacitor of the LDO is charged to a nominal voltage as fast as possible which causes a large amount of current to flow (inrush current). The power source for an LDO, included in a system, can have variable characteristics and constraints. Because of the finite impedance of the sources, these types of LDOs are expected to limit the initial charging current. Large inrush current can cause the power source to dip dangerously low, at times even low enough to cause system-level problems. Many LDOs do not support an inrush current limit feature. Absence of this key feature creates problems that become especially severe if the LDO is capable of high load current, and if an input source is a switching converter. Output of the switching converter can be pulled down by a large inrush current that flows into charge the output capacitor, triggering the switching regulator enable circuit, and in some cases forcing the circuit to reset. The step-down regulator may then cycle between charging and reset states. There needs to be a startup circuit that can limit inrush current in LDOs.

SUMMARY

An example embodiment provides a startup circuit. The startup circuit includes an operational amplifier having an inverting terminal and a non-inverting terminal and an output node. The non-inverting terminal receives a reference voltage. The startup circuit further includes a feedback capacitor coupled between the output node of the operational amplifier and the inverting terminal and a current source coupled between the inverting terminal and ground such that the current source and the feedback capacitor together control rate of change of an output voltage of the operational amplifier.

An example embodiment provides a startup circuit for use in a low dropout regulator (LDO). The startup circuit includes an operational amplifier having an inverting terminal and a non-inverting terminal and an output node. The non-inverting terminal receives a reference voltage. The startup circuit further includes a feedback capacitor coupled between an output node and the inverting terminal and a current source coupled between the inverting terminal and ground such that the current source and the feedback capacitor together control rate of change of an output voltage of the operational amplifier. A comparator is used to stop the rate of change of output voltage after the output voltage has reached a desired value.

An example embodiment provides a system. The system includes a DC-to-DC converter that generates a first output in response to a supply voltage, an LDO that generates a second output in response to the first output and a load receiving the second output. The LDO further includes an operational amplifier having an inverting terminal and a non-inverting terminal and an output node. The non-inverting terminal receives a reference voltage. The startup circuit further includes a feedback capacitor coupled between an output node and the inverting terminal and a current source coupled between the inverting terminal and ground such that the current source and the feedback capacitor control rate of change of an output voltage of the operational amplifier. A comparator is used to stop the rate of change of output voltage after the output voltage has reached a desired value.

Other aspects and example embodiments are provided in the Drawings and the Detailed Description that follows.

BRIEF DESCRIPTION OF THE VIEWS OF DRAWINGS

DETAILED DESCRIPTION OF THE EMBODIMENTS

Embodiments of the disclosure provide a startup circuit for voltage regulators. One embodiment provides a startup circuit for an LDO. Various embodiments are explained using an LDO as an example. However, it will be appreciated that various embodiments can be used in other voltage regulators, for example switching regulators. In general, the startup circuit charges an output capacitor of the LDO in a controlled manner so that current drawn from the power supply is limited. In other words, inrush current is limited if the output capacitor is charged linearly.

In various embodiments, inrush current includes the product of total capacitance and rate of change of voltage to which an output of the LDO regulates. i.e., $$I_{INRUSH} = C_{OUT} * dV_{OUT}/dt \qquad \text{Equation (1)}$$

wherein $I_{INRUSH}$ is the inrush current,
$C_{OUT}$ is the total capacitance at the LDO output, and
$V_{OUT}$ is the voltage to which the LDO regulates.

From equation (1) it is evident that if rate of change of output voltage dVOUT/dt (output voltage ramp) is constant, the output capacitor will be charged linearly. It is noted that dVOUT/dt, output voltage ramp and rate of change of output voltage are used interchangeably throughout the document. In one embodiment, the output voltage ramp is made dependant on charging of another capacitor (feedback capacitor $C_F$) to have a constant output voltage ramp. If the two capacitors $C_{OUT}$ and $C_F$ are charged at the same rate, the currents flowing through the capacitors will be proportional to their capacitances. If the current of $C_F$ is controlled, current flowing through $C_{OUT}$ will be controlled. i.e., $$dV_{OUT}/dt = I_{OUT}/C_{OUT} = I_F/C_F \qquad \text{Equation (2)}$$

wherein $dV_{OUT}/dt$ is the output voltage ramp,
$I_{OUT}$ is the output current flowing through output capacitor $C_{OUT}$, and
$I_F$ is the current flowing through feedback capacitor $C_F$.

Figure 1:
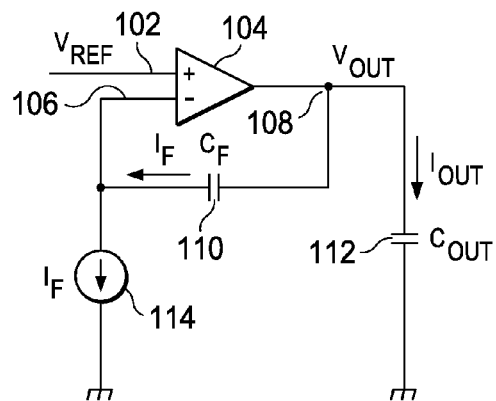
FIG. 1 illustrates a startup circuit according to an embodiment.

Configuration of the operational amplifier of the LDO during startup is illustrated in FIG. 1.

FIG. 1 includes the operational amplifier 104 having an inverting terminal, non-inverting terminal and an output node 108. The operational amplifier 104 receives reference voltage $V_{REF}$ on the non-inverting terminal on a line 102. A feedback capacitor ($C_F$) 110 is connected between the output node 108 and the inverting terminal on a line 106. A constant current source ($I_F$) 114 is connected between the feedback capacitor 110 and ground. An output capacitor ($C_{OUT}$) 112 is connected between the output node 108 and ground. Output voltage ($V_{OUT}$) is taken from the output node 108.

In operation, the current source 114 and the feedback capacitor 110 together controls rate of change of an output voltage of the operational amplifier 104. When the operational amplifier 104 is enabled, the constant current source 114 draws constant current from the feedback capacitor 110 such that rate of change of output voltage (output voltage ramp) is constant. By the property of operational amplifier 104 in a feedback configuration, the inverting terminal is ensured to be at reference voltage since the non-inverting terminal is at the reference voltage. To ensure this, the operational amplifier 104 ramps up output voltage at a constant rate. The feedback capacitor 110 charges linearly according to the amount of current drawn by the current source 114. Also, since output voltage is applied to the capacitors $C_F$ 110 and $C_{OUT}$ 112, the currents flowing through the capacitors $I_F$ and $I_{OUT}$ will be proportional. The above explanation can be summarized using the following equations, $$C_F * dV_{OUT}/dt = I_F \qquad \text{Equation (3)}$$

$$C_{OUT} * dV_{OUT}/dt = I_{OUT} \qquad \text{Equation (4)}$$

$$I_F / C_F = I_{OUT} / C_{OUT} \qquad \text{Equation (5)}$$

$$I_{OUT} = I_F * (C_{OUT}/C_F) \qquad \text{Equation (6)}$$

Wherein $dV_{OUT}/dt$ is the rate of change of output voltage, $I_{OUT}$ is the output current flowing through output capacitor $C_{OUT}$ 112, and $I_F$ is the current flowing through feedback capacitor $C_F$ 110.

Figure 2:
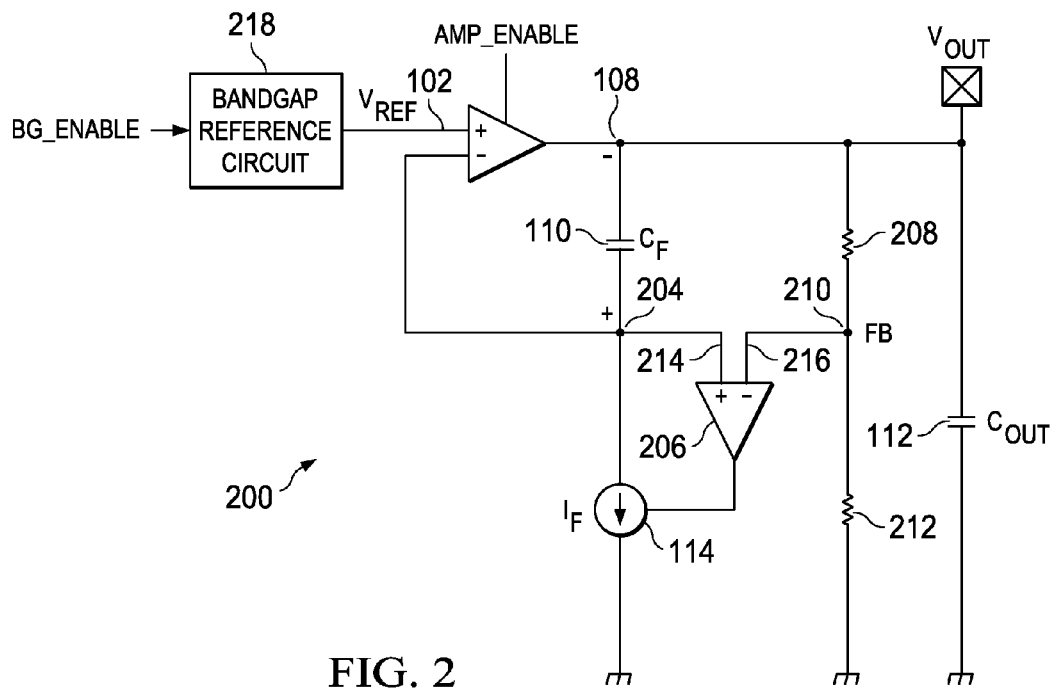
FIG. 2 illustrates a low drop-out (LDO) regulator with a the startup circuit according to another embodiment.

An LDO 200 with the startup circuit is illustrated in FIG. 2. Operation of the LDO with the startup circuit is explained using FIG. 2, FIG. 3A and FIG. 3B. Referring now to FIG. 2, the LDO 200 includes a bandgap reference circuit 218 supplying a reference voltage ($V_{REF}$) to a non-inverting terminal of the operational amplifier 104 on the line 102. The bandgap reference circuit 218 receives an enable signal BG_ENABLE on a line 220. The operational amplifier 104 receives an enable signal AMP_ENABLE on a line 202. A feedback capacitor ($C_F$) 110 is connected to an output node 108. A low voltage terminal of the feedback capacitor 110 is coupled to the output node 108 and the high voltage terminal of the feedback capacitor 110 is connected to a node 204 which is further connected to the inverting terminal of the operational amplifier 104 on a line 106. The constant current source 114 is connected between the node 204 and ground. A resistor divider (with resistors 208 and 212) is connected to the output node 108 and to the ground. A feedback node (FB) 210 is defined on the resistor divider. One input terminal of a comparator 206 is connected to the node 204 and another to the node 210. An output terminal of the comparator 206 is connected to the current source 114. An output capacitor ($C_{OUT}$) 112 is connected between the output node 118 and ground.

One way to ramp up the output voltage at a constant rate is to make the reference voltage ramp up constantly and to let the operational amplifier 104, which is in a feedback configuration, follow the reference voltage ramp up. However, the operational amplifier 104 would be required to function with common mode voltage with the input varying from zero volts to $V_{REF}$. This may affect design freedom of the input pair of the operational amplifier and also can compromise performance of the LDO. In contrast, in one embodiment, $V_{REF}$ to the operational amplifier 104 is maintained at the nominal value. In this embodiment, the feedback capacitor 110 is pre-charged to $V_{REF}$ before the startup ramp such that charging of the output starts smoothly from zero volts. And eventually, in the normal operation, the LDO has to be operating with the resistor divider (208, 212) and the output capacitor 112. The initial charging and handing off to normal operation of the LDO 200 is illustrated in FIGS. 3A and 3B.

Figure 3A:
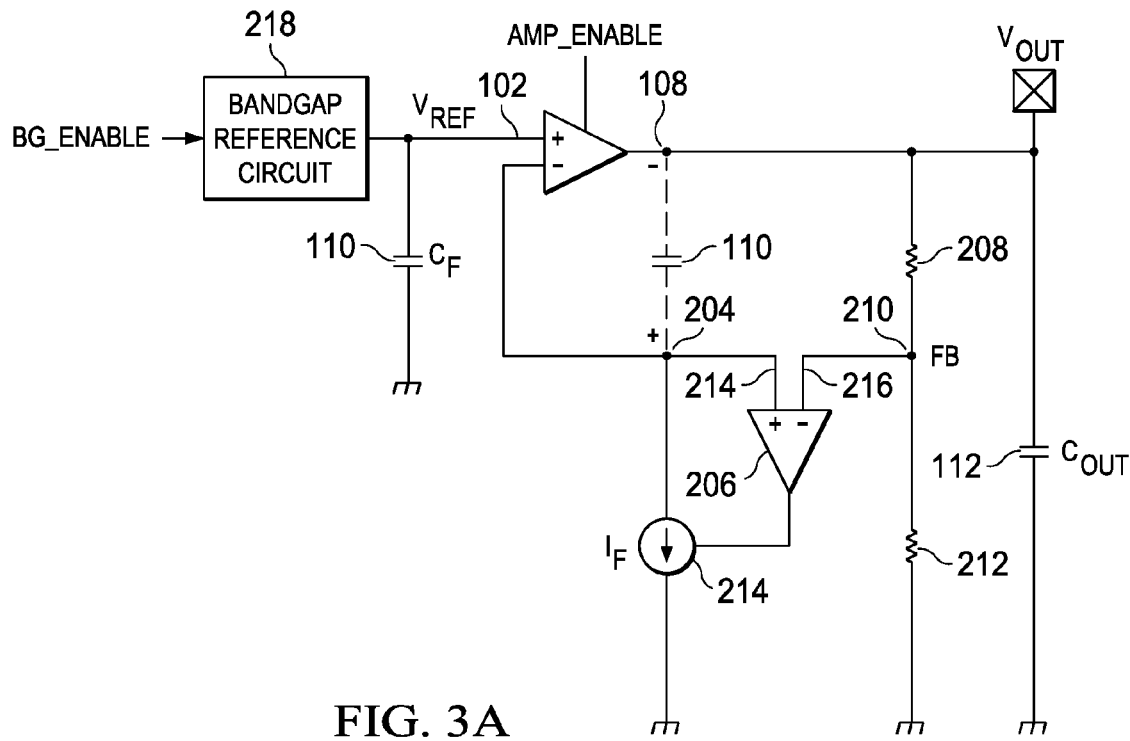
FIG. 3A and FIG. 3B illustrate feedback capacitor connection before and after activating operational amplifier.
Figure 3B:
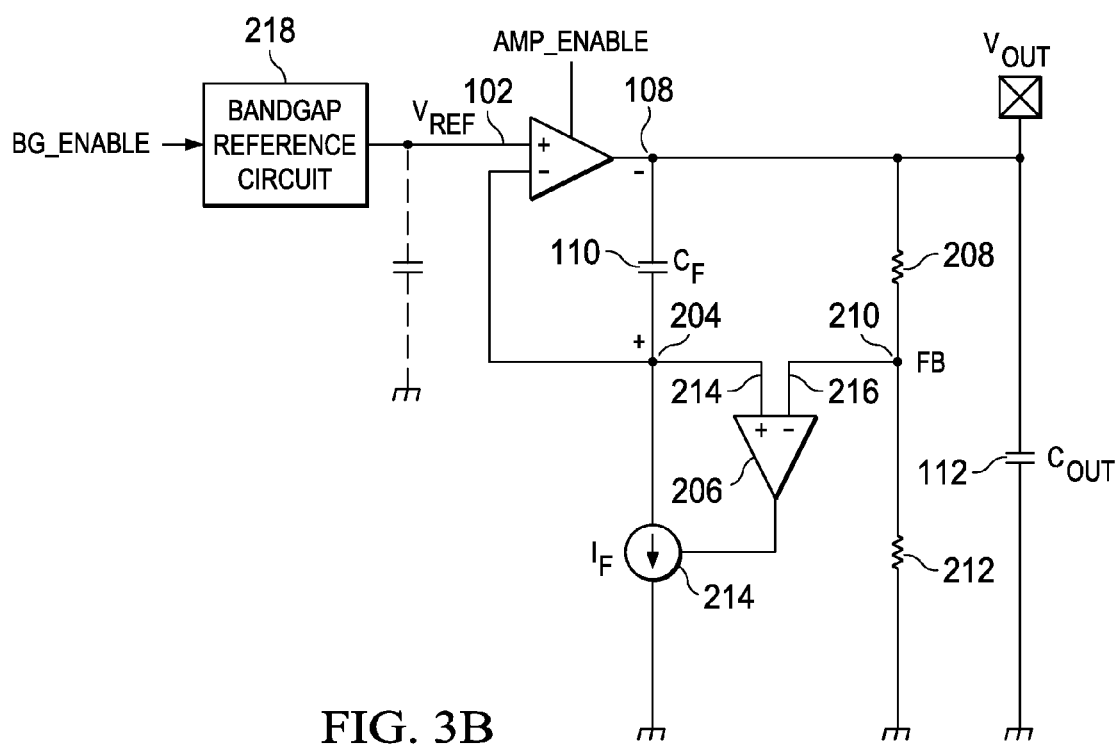

In FIG. 3A, the feedback capacitor 110 is connected to the bandgap reference circuit 218. The bandgap reference circuit 218 receives the BG_ENABLE signal on a line 220. In operation, the bandgap reference circuit 218 is enabled using BG_ENABLE signal. Once the bandgap reference circuit 218 is enabled, feedback capacitor 110 is charged to $V_{REF}$. Then, prior to activating the operational amplifier 104, the feedback capacitor 110 is connected at the output node 108 with opposite polarity as illustrated in FIG. 3B and the output voltage ramp starts. A lower voltage terminal of the feedback capacitor 110 is connected at the output node 108 and a higher voltage terminal is connected to the inverting terminal of the operational amplifier 104. Initially the node 108 stays at zero volts. But, because the feedback capacitor is charged to $V_{REF}$ prior to activating the operational amplifier 104, node 204 is at $V_{REF}$. Hence both the inputs of the operational amplifier 104 are at $V_{REF}$ and the current source 114 starts drawing current.

The output voltage ramp is stopped when it reaches a nominal value by monitoring the feedback node 210. It is noted that when output voltage reaches the nominal value, the voltage at the feedback node 210 (feedback voltage) will be equal to $V_{REF}$. The comparator 206 compares the feedback voltage 210 with $V_{REF}$ and trips when the output voltage has reached a nominal value. In other words, the comparator trips when the feedback voltage is higher than the reference voltage and stops rampup of the output voltage and shuts off the current source 114 that configures LDO in the normal operation. Feedback node 210 is further connected to the inverting terminal of the operational amplifier 104 as part of the normal operation. The feedback capacitor 110 can also be used as a noise reduction capacitor that is connected between the output and the inverting terminal of the operational amplifier 104.

Figure 4:
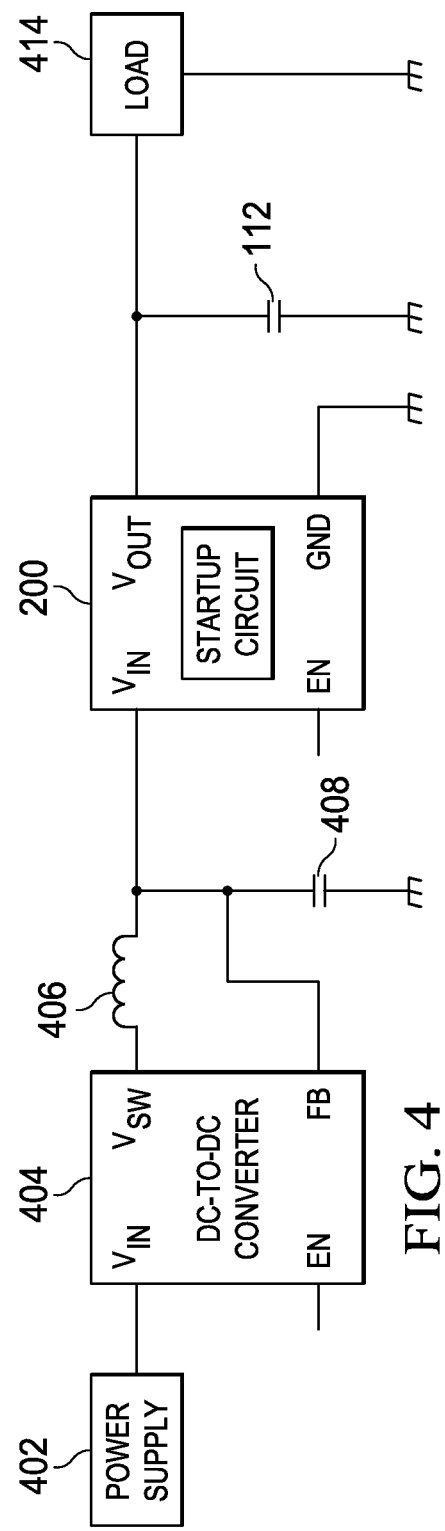
FIG. 4 illustrates an application of the startup circuit in an LDO according to an embodiment.

An example system implementation, where a DC-to-DC converter is followed by an LDO 200 with the startup circuit is illustrated in FIG. 4. The system includes a power supply 402 connected to the DC-to-DC converter 404. The DC to DC converter 404 may be a conventional DC-to-DC converter known in the art. In one exemplary embodiment, the DC-to-DC converter may be a buck converter having an LC filter that includes an inductor 406 and a capacitor 408. Further, an output of the DC-to-DC converter 404 is connected to the LDO 200. The LDO 200 includes a startup circuit as illustrated in FIG. 2 according to an embodiment. The LDO 200 includes an output capacitor 112. An output of the LDO 200 is connected to a load 414. In one embodiment, the load 414 may be a processor or a circuit that the LDO is powering.

In operation, the DC-to-DC converter 404 receives a supply voltage from the power supply 402. The DC-to-DC converter 404 converts the supply voltage to a desired output voltage (first output). The LC filter filters the ripples in the output voltage of the DC-to-DC converter 404. The output voltage is supplied to the LDO 200. The LDO 200 supplies a constant voltage (second output) to the load 414 for proper operation. In general, the startup circuit charges an output capacitor 112 of the LDO 200 in a controlled manner so that current drawn from the power supply 402 is limited. In other words, inrush current is limited if the output capacitor 112 is charged linearly.

In the foregoing discussion, the term "connected" means at least either a direct electrical connection between the devices connected or an indirect connection through one or more passive or active intermediary devices. The term "circuit"

means at least either a single component or a multiplicity of components, either active or passive, that are connected together to provide a desired function. The term "signal" means at least one current, voltage, charge, data, or other signal.

The forgoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

What is claimed is:

1. A startup circuit for limiting inrush current in a regulator having a capacitance at an output comprising:
   an operational amplifier having an inverting terminal and a non-inverting terminal, the non-inverting terminal receiving a reference voltage;
   a feedback capacitor connected to an output node of the operational amplifier and coupled to the inverting terminal; and
   a current source connected to the inverting terminal and coupled to ground such that the current source and the feedback capacitor together control rate of change of an output voltage of the operational amplifier to charge the capacitance at the output, wherein the feedback capacitor is pre-charged to the reference voltage before activating the operational amplifier and wherein the high voltage terminal of the pre-charged feedback capacitor is coupled to the inverting terminal of the operational amplifier and the low voltage terminal of the pre-charged feedback capacitor is coupled to the output node.

2. The startup circuit of claim 1, wherein the current source draws constant current from the feedback capacitor such that the rate of change of the output voltage is constant.

3. The startup circuit of claim 2, wherein the feedback capacitor charges linearly according to an amount of current drawn by the current source.

4. The startup circuit of claim 3 further comprising:
   an output capacitor coupled to the output node that charges linearly according to the rate of change of the output voltage.

5. The startup circuit of claim 1 comprises a startup circuit in at least one of a low dropout regulator and a switching regulator.

6. A startup circuit for use in a regulator having a capacitance at an output, comprising:
   an operational amplifier having an inverting terminal and a non-inverting terminal, the non-inverting terminal receiving a reference voltage;
   a feedback capacitor connected to an output node of the operational amplifier and coupled to the inverting terminal;
   a current source connected to the inverting terminal and coupled to ground such that the current source and the feedback capacitor together control rate of change of an output voltage of the operational amplifier to charge the capacitance at the output; and
   a comparator that trips in response to a desired value of the output voltage that stops the rate of change of output voltage, wherein the feedback capacitor is pre-charged to the reference voltage before activating the operational amplifier and wherein the high voltage terminal of the pre-charged feedback capacitor is coupled to the inverting terminal of the operational amplifier and the low voltage terminal of the pre-charged feedback capacitor is coupled to the output node.

7. The startup circuit of claim 6 further comprising:
   a bandgap reference circuit supplying the reference voltage to the operational amplifier.

8. The startup circuit of claim 6, wherein the comparator receives feedback voltage from a resistor divider at the output node on one terminal and the reference voltage on another terminal.

9. The startup circuit of claim 8, wherein the comparator is coupled between a resistor divider coupled to the output node, and an output of the bandgap reference circuit such that the current source is disabled when the feedback voltage is higher than the reference voltage.

10. The startup circuit of claim 6, wherein the comparator is coupled between a resistor divider at the output node and the non-inverting terminal such that the current source is disabled when the feedback voltage is higher than the reference voltage.

11. The startup circuit of claim 6 comprises a startup circuit in at least one of a low dropout regulator and a switching regulator.

12. A system comprising:
   a DC-to-DC converter that generates a first output in response to a supply voltage;
   a low dropout regulator having a capacitance at an output node that generates a second output in response to the first output, the low dropout regulator further comprising:
   an operational amplifier having an inverting terminal and a non-inverting terminal, the non-inverting terminal receiving a reference voltage;
   a feedback capacitor connected to an output node of the operational amplifier and coupled to the inverting terminal;
   a current source connected to the inverting terminal and coupled to ground such that the current source and the feedback capacitor control rate of change of an output voltage of the operational amplifier in order to charge the capacitance at the output node of the low dropout regulator linearly; and
   a comparator that trips in response to a desired value of the output voltage that stops the rate of change of output voltage; and
   a load receiving the second output, wherein the feedback capacitor is pre-charged to the reference voltage before activating the operational amplifier and wherein the high voltage terminal of the pre-charged feedback capacitor is coupled to the inverting terminal of the operational amplifier and the low voltage terminal of the pre-charged feedback capacitor is coupled to the output node.

13. The startup circuit of claim 12 further comprising:
   a bandgap reference circuit supplying the reference voltage to the operational amplifier.

14. The system of claim 12 comprising a startup circuit in at least one of a low dropout regulator and a switching regulator.

* * * * *